United States Patent
Kreidl et al.

[11] 3,929,422
[45] Dec. 30, 1975

[54] MEANS FOR RECOMBINING HYDROGEN AND OXYGEN IN A SEALED BATTERY AND CONTROLLING RECOMBINATION AT CATALYST SURFACES

[75] Inventors: Ekkehard L. Kreidl, Wayland; Douglas Shooter, Winchester, both of Mass.

[73] Assignee: Koehler Manufacturing Company, Marlborough, Mass.

[22] Filed: July 22, 1974

[21] Appl. No.: 490,715

Related U.S. Application Data

[60] Continuation of Ser. No. 77,691, Oct. 2, 1971, abandoned, Division of Ser. No. 866,531, Oct. 15, 1969, Pat. No. 3,630,778.

[52] U.S. Cl. ............. 23/288 R; 23/288 K; 423/580; 252/477 R; 252/466 PT; 252/472; 136/179; 136/181
[51] Int. Cl.² .......................................... B01J 35/10
[58] Field of Search .......... 23/288 F, 288 R, 288 K; 423/580; 252/477 R, 466 PT, 472; 136/179, 181

[56] References Cited
UNITED STATES PATENTS

| | | | |
|---|---|---|---|
| 2,330,539 | 9/1943 | Auchter ..................... | 252/477 R X |
| 2,423,907 | 7/1947 | Schulze ..................... | 252/477 R X |
| 2,687,449 | 8/1954 | Gulick et al. ..................... | 136/179.1 |
| 3,102,059 | 8/1963 | Harmer ..................... | 136/181 |
| 3,259,454 | 7/1966 | Michalko ..................... | 23/288 F X |
| 3,274,287 | 9/1966 | Moore et al. ..................... | 252/466 PT |

*Primary Examiner*—James H. Tayman, Jr.
*Attorney, Agent, or Firm*—Munroe H. Hamilton

[57] ABSTRACT

Hydrogen and oxygen gases are safely recombined in the presence of a catalytic device which operates in two stages in a secondary battery system. Recombination continues in a controlled manner while the battery is on discharge and charge for periods corresponding to the normal life of a conventional secondary battery. In sealed secondary battery systems hydrogen and oxygen gases evolved during operation of the battery are releasably contained through a range of pressures during which long-term stoichiometric recombination of the gases takes place.

The catalytic device in a preferred form comprises a foraminous body which includes exposed catalytic surfaces of relatively low gas recombining capacity and an inner nucleus of enclosed catalytic material. The nucleus comprises enclosed catalytic surfaces on which gases passing through the formaminous body react initially within a thermally favorable environment whereby cumulative heating can take place. A resulting build-up of heat at the nucleus is released to raise the temperature of the exposed catalytic surfaces to temperatures at which gases coming into contact with the exposed catalytic surfaces will start to recombine thereon, and continue to react in a sustained manner within a limited temperature range. When, as may occur, the exposed catalyst surfaces are subjected to increasing gas pressure in the battery they become self-limiting in the extent to which their temperature may be raised by exothermic reaction.

Thus the rate of recombination of gases at catalyst surfaces is controlled and limited to positively prevent the exposed catalyst surfaces from reaching temperatures at which an explosion may take place, i.e., temperatures found to be within upper limits of from about 400°C up to about 600°C, and the range of control may be extended downwardly to values as low as 250°C for some battery operations. Water resulting from the controlled recombination at the catalyst surface is returned to the electrolyte with catalyst surfaces being maintained in a constantly reactive condition.

1 Claim, 20 Drawing Figures

MEANS FOR RECOMBINING HYDROGEN AND OXYGEN IN A SEALED BATTERY AND CONTROLLING RECOMBINATION AT CATALYST SURFACES

This is a continuation application of application Ser. No. 77,691 filed Oct. 2, 1971, now abandoned, a divisional application of Ser. No. 866,531 filed Oct. 15, 1969, now U.S. Pat. No. 3,630,778 issued Dec. 28, 1971.

This invention relates to means for reacting substances in the presence of a composite catalytic device whose capacity for inducing a reaction such as recombination of gases may be controlled in a desirable manner. More particularly, the invention is concerned with means for operating and periodically recharging a secondary battery system throughout a number of battery charge and discharge cycles while controlling the rate fo recombination of gases in the presence of a composite catalytic device within temperature limits which will avoid ignition of hydrogen and oxygen with danger of explosion, especially in a sealed battery system.

It is well known to those skilled in the art that problems arise in attempting to confine hydrogen and oxygen under pressure and to safely recombine the gases particularly in a sealed secondary battery system. In addition to overcoming pressure hazards a further important requirement is that the recombination capacity of the catalyst per unit of surface area of the catalyst be continuously maintained sufficiently high to recombine stoichiometric quantities of gases efficiently at all times. A basic difficulty encountered is the danger of combining so as to ignite the gases with high risk of explosion. Even though pressure is resolved, this may occur if the rate of recombination proceeds too rapidly causing the catalyst to increase in temperature to a value where ignition can take place.

This further hazard may arise when combustible gases are produced by the battery following a period in which no combustible gases have been produced. In this case the catalyst means may take some time before becoming fully active. During this extended activation time the available amount of reactable gases may increase and thus the gas pressure increases. With a large enough increase, the catalyst means when becoming suddenly activated may overheat even though the rate of gas evolution from the electrolyte may be within safe limits.

It is therefore a chief object of the invention to deal with the problem area indicated and to provide an improved means for operating a secondary battery while continuously controlling recombination of hydrogen and oxygen in the presence of a reliable and efficient catalyst within safe limits which will maintain the catalyst in an operable state and avoid heating the catalyst to explosion temperatures.

Another specific object of the invention is to devise an improved catalytic device characterized by a relationship between its rate of recombination and heat generation and its heat loss such that rise in temperature of the catalyst due to exothermically induced heating can be limited within safe bounds for any given battery configuration, and yet the catalyst surfaces may be relied upon to initiate and sustain recombination of gases at a rate which will prevent excessive pressure build-up due to varying amounts of hydrogen and oxygen evolved through prolonged periods of battery operation.

Still another object of the invention is to combine in a catalytic device exposed catalytic surfaces of relatively low-level gas recombining capacity and an inner catalytic nucleus on which gases can react initially to provide cumulative heating and raise the temperature of the exposed surfaces to a value at which they can support and carry on continuous recombination of gases within a safely limited temperature range.

With the foregoing objectives in mind, we have devised an improved composite catalytic device with which we are enabled to carry out an improved method of operating and periodically recharging a secondary battery system such as a sealed secondary battery system. The concept of recombination with a composite catalytic device has originated from knowledge of improved methods for controlling the rate of recombination of hydrogen and oxygen gases described in connection with a method of long-term stoichiometric recombination as disclosed in a co-pending application, Ser. No. 726,000 filed May 2, 1968, entitled "Method and Apparatus for Operating and Periodically Recharging a Secondary Battery" and a second co-pending application entitled, "Improvements in Construction and Operation of Rechargeable Battery Systems for Chemically Regenerating an Electric Current", both owned by the assignee of the present application.

As a result of extended experimentation, it has been determined as disclosed in the second co-pending application above noted that the intrinsic recombining capability of a catalytic material may be limited so as to maintain exothermically induced rise in catalyst temperatures from increasing above a range of temperatures at which the rate of recombination results in ignition of the gases with explosion, i.e., a range of temperatures whose upper limits have been determined to be from about 400°C up to about 600°. Limitation of recombining capability of a catalytic material to achieve these temperature limits may restrict, to some degree, the capability of the catalytic material to start or initiate a reaction of the gases, but slow starting is improved by heating the catalyst.

Essentially the concept of recombination with a composite or multistage catalytic device is based on the idea of utilizing a foraminous body which includes exposed catalytic surfaces of intrinsic low-level gas recombination capability and hence sluggish starting characteristics, and further providing within the foraminous body an inner nucleus of enclosed catalytic surfaces on which gases may recombine initially to provide cumulative heating. Heat thus generated is released to raise the temperature of the exposed catalytic surfaces to a value at which recombination can be positively started at the exposed surfaces and substantially all gases may thereafter be recombined at the exposed surfaces.

In one simple form, our concept of a composite catalytic device of this nature may be implemented by the composition of an inner nucleus of catalytic material of relatively high-level gas recombination capability which can initiate recombination of gases in a very positive manner and provide cumulative heating for an outer surrounding body of catalytic material of low-level activity. Increasing the temperature of the low-level catalytic material enables it to readily start and carry on recombination of a substantial portion at least of the gases at its outer surface areas efficiently and more safely than could be done by the nucleus itself if it were in direct contact with the main body of the reactive gases. Thus the nucleus and outer catalytic material are arranged in such intimate relationship that they may cooperate with one another desirably in carrying out safe and efficient recombination of gases.

In another desirable form our concept of a composite catalytic device may be implemented by a multiplicity of catalytic pellets of low-level activity suitably arranged in a pile or mass to constitute a bed in which there are exposed outer surfaces and an enclosed nucleus of catalyst surfaces on which gases can react initially within a thermally favorable environment to provide cumulative heating of the nucleus and subsequent release of heat to the exposed surfaces.

We have also discovered that when utilizing a composite catalytic device of the character described in a battery where hydrogen and oxygen pressures increase, there is caused to take place heat release from the outer catalytic surfaces in increasing degree by means such as radiation, conduction and convection until the heat release equals or exceeds exothermically induced heat in the exposed catalyst surfaces and their temperatures cease to rise.

In utilizing the upper temperature limits of about 400°C–600°C as disclosed in our second co-pending application above noted, it should be understood that explosion temperature limits under practical conditions may be further dependent on other environmental factors such as the surface properties of materials containing explosive mixtures and so forth. Accordingly actual explosion limits have to be determined for any given set of conditions. Thus the corrosive nature of secondary batteries and the many rugged use conditions have made the use of rubbers and plastics common practice with hard rubber in recent practice being frequently replaced by synthetic resins such as polypropylenes, polycarbonates, acrylics, etc. While catalytic devices have been designed using ceramic enclosures, design freedom makes it frequently desirable to use plastic structures for their containment also. We may prefer, therefore, to design composite catalytic devices which are limited to an upper temperature limit considerably below that desirable from a mere explosion hazard point of view as to make them reliable with plastic battery construction, such as is particularly desirable for such devices having a low-level peripheral zone. It has been found that low-level catalytic materials are more vulnerable to electrolyte spray so that the design freedom achievable with plastics is emminently desirable. Since for modern high-temperature plastics 250°C is about an upper limit for longterm durability, we may prefer to control the temperature of the outer surface of the composite catalytic material so as not to exceed this upper limit. A convenient way of establishing the maximum temperature limit is to determine the temperature which is not exceeded when subjecting the composite catalytic material suddenly to about four atmospheres of stoichiometric hydrogen and oxygen as hereafter disclosed in reference to FIG. 10.

The mature of the invention and its other objects will be more fully disclosed in connection with a detailed description of the invention as illustrated in the accompanying drawings, in which.

In accordance with the method of the invention, we recombine gases evolved during a sealed battery operation, and particularly while the sealed battery is on charge, by bringing the gases into contact with a catalytic device which may function in two stages. One preferred form of composite catalytic device C is shown in a battery E in FIGS. 2–5 inclusive. Also in FIGS. 7–9, inclusive, we have shown this preferred form of composite catalytic device C removed from the battery. The remaining figures illustrate other forms of catalytic device which will be discussed at a later point in the specification.

In general, the composite catalytic device C comprises a foraminous body which includes exposed catalytic surfaces of a relatively low-level gas recombining capability, and an inner nucleus of enclosed catalytic material which can recombine gases only after they have passed through the outer exposed catalytic surfaces. Reaction of gases initially on the enclosed catalytic surfaces of the nucleus takes place within a thermally favorable environment whereby cumulative heating in the nucleus can occur. A resulting build-up of heat in the nucleus may thereafter be released to significantly raise the temperature of the exposed catalytic surfaces of low-level reactivity to temperatures at which they are more reactive. Gases such as hydrogen and oxygen coming into contact with the exposed surfaces, thus heated, will then start to recombine and continue to react in a sustained manner with the exposed catalytic surfaces being maintained in a limited temperature range.

An important feature of this manner of recombination is that the exposed catalytic surfaces of low-level activity, although they can be heated to increase their activity level to a workable point for initiating and maintaining recombination of hydrogen and oxygen, will, nevertheless, in the presence of increasing pressure in the battery, resist a rise in temperature due to exothermic heat of recombination beyond determinable limits which are well below temperatures at which the gases can recombine explosively.

The importance of this self-limiting feature is especially significant in operating batteries over extended periods, and particularly so, in reference to an extended sealed battery operation such as described in co-pending application, Ser. No. 726,000 noted above. As disclosed in Ser. No. 726,000 hydrogen and oxygen gases occurring in excess of stoichiometric quantities are referred to as residual gases and these residual gases evolved during successive cycles of miners' lamp battery charge and battery discharge are confined within predetermined releasable limits in a closed gas retaining space and are held throughout a range of continuous pressure variations in which residual gas representing excess over stoichiometry of one component gas during some periods of operation recombines with residual gas representing excess over stoichiometry of the second component gas during other periods of operation, thereby to preserve a uniform electrolyte level and concentration.

We may carry out our improved method of recombination in various forms of sealed batteries and in one typical instance, we employ our composite catalytic device in a miners' lamp battery, and details of construction and operation of a miners' lamp battery are noted below in order that the method of the invention may be more clearly understood and appreciated.

A miners' lamp battery is cited as particularly exemplary of a battery requiring high reliability, careful maintenance and continuous use. It will be apparent that two basic operations are required to be carried out in an alternating sequence. During one operation, the battery must be placed on discharge in use in the field, and in another operation, the battery must be placed on charge while not in use. The construction, specific operation and conventional gassing behavior of a miners' battery are noted below to more fully substantiate the premises on which controlled rate of recombination of gases with a composite or multi-stage catalyst is employed in connection with the long-term stoichiometric recombination method of application Ser. No. 726,000.

As noted in application Ser. No. 726,000, one very common miners' lamp battery has a nominal rating of 4 volts resulting from two cells in series. It has an ampere-hour rating of 12 at a 10 hour discharge rate, one tubular type positive plate and two pasted negative plates per cell, and electrolyte-absorbing separators which, with the plates, contain all but about 20 ml of the 170 ml of electrolyte in each cell.

A gas space of approximately 75 ml is provided above the plates in each cell, and there is also a constantly-open but baffled or labyrinthine vent passage from each cell to the atmosphere. Such a battery typically is discharged daily for 10 hours through a lamp with rating of 1.0 ampere at 4.0 volts and is charged for 14 hours daily by means of a charger with output of 4.4 volts and 1.2 amperes at the beginning of charge and 5.1 volts and 0.09 amperes at the end of charge.

The gassing behavior during the charging period for such batteries in such a discharge-charge cycle is highly variable as indicated by the battery gassing measurements shown in TABLE 1. This TABLE 1 is based on measurements taken during the charging portion of about one out of every three cycles following the number of previous conditioning cycles shown as noted below:

TABLE I

| Battery Number | 1 | 2 | 3 |
|---|---|---|---|
| Number of conditioning Cycles Previous to Gassing Measurements | 0 | 176 | 265 |
| Number of Charges when Total Gas (Hydrogen plus Oxygen) Evolved per cell was within range of ml of: | | | |
| 200–300 | 2 | | |
| 300–400 | 5 | | |
| 400–500 | 8 | 8 | 5 |
| 500–600 | 6 | 10 | 1 |
| 600–700 | 3 | 7 | 1 |
| 700–800 | | 7 | 2 |
| 800–900 | | 6 | 1 |
| 900–1000 | | 3 | |
| 1000–1100 | 1 | 3 | |
| 1100–1200 | 1 | 2 | |
| 1200–1300 | | | |
| 1300–1400 | | | |
| 1400–1500 | | 5 | |
| 1500–1600 | | 3 | |
| Total (For 2 Cells) | 26 | 54 | 10 |

As indicated by the data in Table 1, the amount of gas evolved during charge is at least several times the gas space volume in each cell, which means that during a single charging period a pressure of at least several atmospheres would develop if the gases were confined within the cells and not recombined in any way. (Gas evolved during discharge has been found to average about 5% of the average amount evolved during charge.) The data also illustrate that the amount of gas evolved during a charging period may vary quite widely, from as little as 200 ml to as much as 1600 ml per cell, though there is a concentration of data in the 400–600 ml range.

Not only do the typical miners' lamp batteries described above exhibit a wide range in total volume of gas evolved during each of a series of charging periods, but they also exhibit a wide range in the relative amounts of hydrogen and oxygen evolved during each of the series of charging periods as illustrated in TABLE 2 noted below. TABLE 2 shows the hydrogen/oxygen volume ratio for the same batteries and during most of the same charging periods represented by the data in TABLE 1.

TABLE 2

| Battery Number | 1 Each Cell | 2 Each Cell | 3 Each Cell |
|---|---|---|---|
| Number of Charges When Hydrogen/Oxygen Ratio of Evolved Gas was Within Range of: | | | |
| .2–.6 | | 3 | |
| .6–1.0 | 6 | 2 | |
| 1.0–1.4 | 2 | 1 | |
| 1.4–1.5 | 6 | 8 | 6 |
| 1.8–2.2 | 10 | 9 | 2 |
| 2.2–2.6 | 1 | 4 | 1 |
| 2.6–3.0 | 1 | 2 | |
| 3.0–3.4 | | | |
| 3.4–3.8 | | 1 | 1 |
| 3.8–4.2 | | | |
| 4.2–4.6 | | 1 | |
| 4.0–5.0 | | | |
| 5.0–5.4 | | | |
| 5.4–5.5 | | | |
| 5.8–6.2 | | 1 | |
| Total | 26 | 32 | 10 |

The data in TABLE 1 and TABLE 2 demonstrate the wide variations in gassing volume and gas composition occurring in batteries regardless of age. The basic concept of the method of long-term stoichiometric recombination of Ser. No. 726,000 is based on the discovery that by operating a conventional battery having non-stoichiometric gassing behavior as described, in a closed system, and by sealing it and essentially preventing the escape of gas, its long-term behavior can be made to be stoichiometric. To take advantage of this discovery, and this is an important aspect of the present invention, it is necessary to recombine as much of the gas evolved as possible by means of a suitable recombination device, that is, as much as possible of that amount in the gas space above the electrolyte which is capable of reacting (stoichiometrically) to form water and leaving only residual excess gas in the said space. It will be apparent that for this purpose, a catalytic device of the highest possible reliability is desirable.

Figure 1:
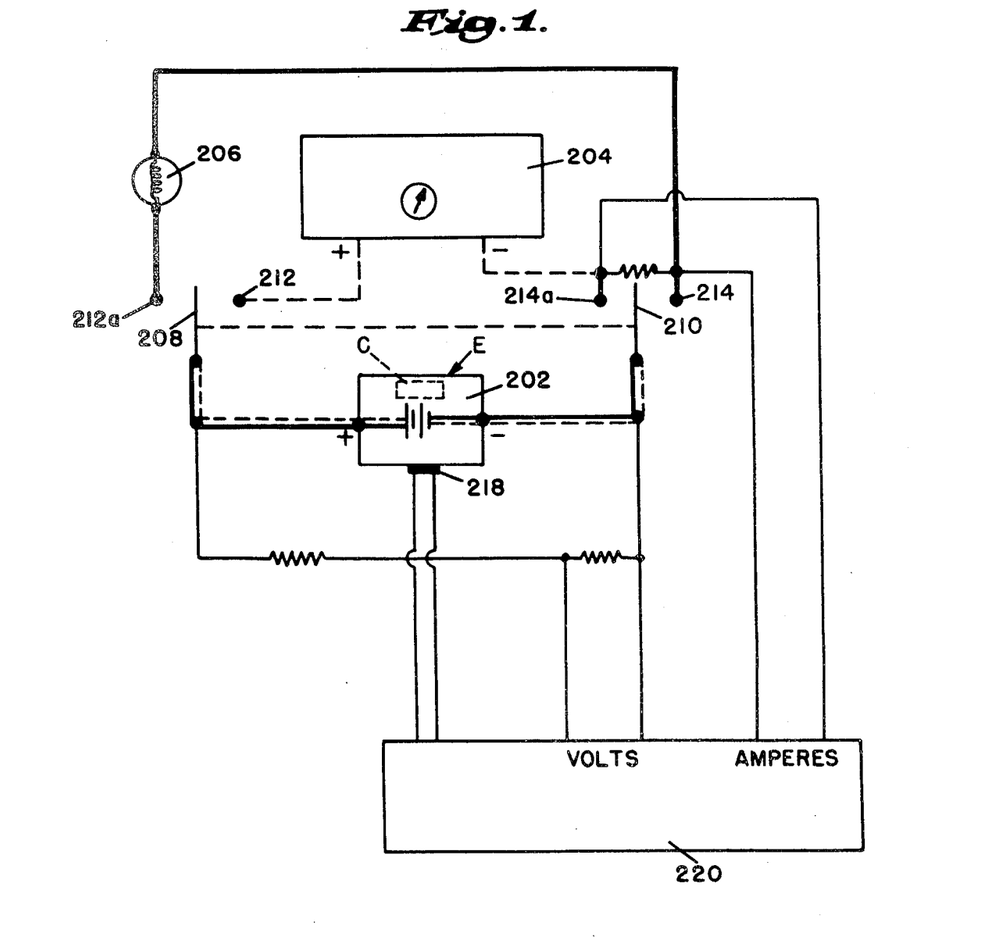
FIG. 1 is a diagrammatic view illustrating a battery system which may be operated and periodically recharged in accordance with the recombination method of the invention.
Figure 2:
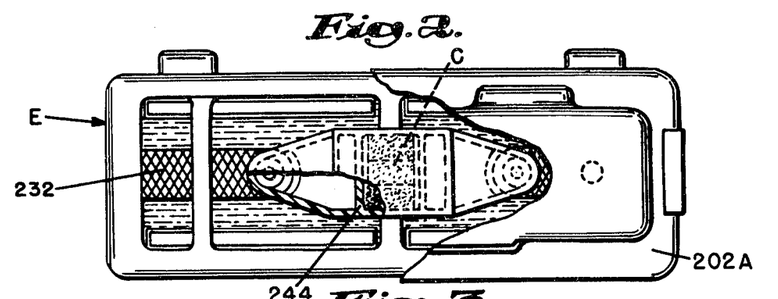
FIG. 2 is a plan view of a battery of the general type indicated in FIG. 1.

The apparatus shown in FIG. 1 illustrates diagrammatically one simple sealed system by means of which the composite catalyst of the present invention may be employed and the long-term stoichiometric recombination concept may be implemented. This battery system may be operated on discharge and charge periodically in accordance with the method of the invention in the course of which evolution of hydrogen and oxygen takes place and stoichiometric amounts of the gases are recombined while residual gases are confined during a number of charging cycles and are eventually recombined by long-term stoichiometric recombination. FIG. 1 also illustrates one simple pressure-recording means which is not essential in the method of operation but which can be conveniently utilized to observe battery conditions where this may be desirable.

Figure 5:
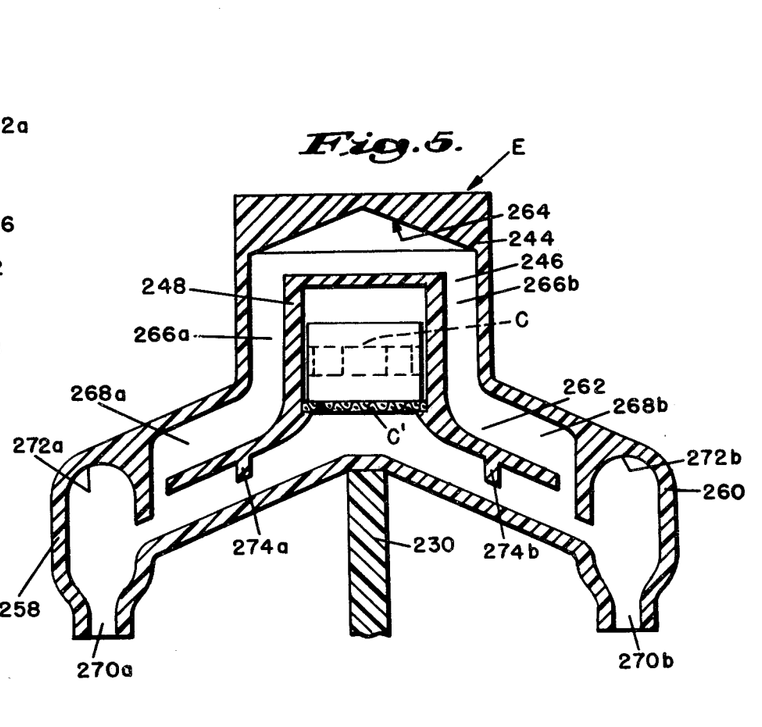
FIG. 5 is a detail cross sectional view of a recombining device with catalyst contained therein.
Figure 6:
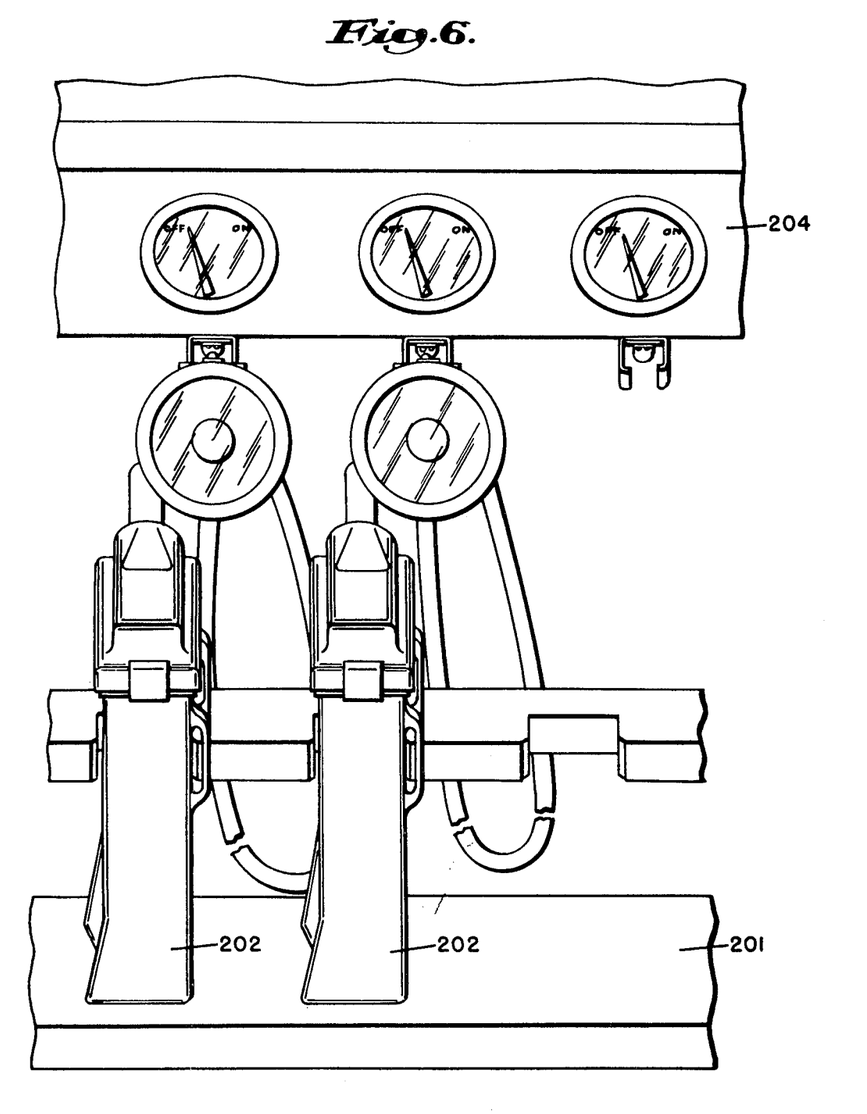
FIG. 6 is an elevational view illustrating fragmentarily a battery charging apparatus with which the battery of FIGS. 2–4 may be recharged in accordance with the invention.

Referring more in detail to FIG. 1, the battery system shown includes a battery E having the composite catalytic device of the invention mounted therein, and it will be understood that recombination of gases becomes most essential when battery E is connected to the battery-charging apparatus shown in FIGS. 1 and 6. In these FIGURES, numeral 204 denotes a battery-charging apparatus of the class commonly utilized by miners in placing a battery on charge at the end of the working day. The battery casing is indicated by numeral 202, and is illustrated in further detail in FIGS. 2–5, inclusive, and details of the charger 204 are also shown in FIG. 6. Catalytic device C is indicated in dotted lines in the casing 202 of FIG. 1.

In the apparatus indicated means are provided for enabling an operator to use the battery on discharge and to change from a battery discharge operation to a battery charging operation in one simple way. For example, in placing the battery E on discharge, a circuit from the positive side of the battery E is completed through a lamp 206 and back to the negative side of the battery by moving the double throw switch poles 208 and 210, into contact with switch contacts, 212a and 214a, respectively. Current is then generated in the battery in the usual manner and energizes the lamp 206. Such a battery discharge operation is intended to be representative of daily use of the battery by a miner.

When the battery is to be recharged the battery is connected to charger 204. Switch poles 208 and 210 are then moved into contact with battery charging switch contacts 212 and 214. This disconnects the lamp 206 and completes a circuit from the charger 204 through the battery E and charging then takes place. Such a battery charging operation is intended to be representative of a miner placing battery E in a charging rack 204 as suggested in FIG. 6. The battery during its charging operation evolves gases which are, in accordance with the invention, confined in the sealed battery E by suitable sealing means and exert fluctuating pressures. These pressures acting through a transducer 218 may provide signals for actuating an electrical recording system 220 as indicated at the lower right hand side of FIG. 1, where arrangements for monitoring voltage and ampere during charge and discharge are also indicated.

Considering in greater detail the battery arrangement shown in FIGS. 2–5, battery casing 202 includes a body portion having suitable strength characteristics and further provided with a sealed top 202a. In this body portion is a battery partition 230 which divides the battery into two cells.

Assuming that the battery is to have a rating comparable to the performance of the 4 volt miners' battery earlier described, the battery casing or body portion is constructed of a material having a strength which will withstand a predetermined range of pressures. For example we may employ a polycarbonate plastic to provide the necessary strength. Polycarbonate plastics may be described as polymeric combinations of bifunctional phenols or bisphenols, linked together with a carbonate linkage.

In utilizing a plastic material such as polycarbonate we have, for example, determined that the battery may be constructed to contain a range of pressures extending from below 0 pressure all the way up to as high as 5 atmospheres. In addition the over-all size of the battery is regulated in accordance with the specific plate construction and quantity of electrolyte employed.

Figure 3:
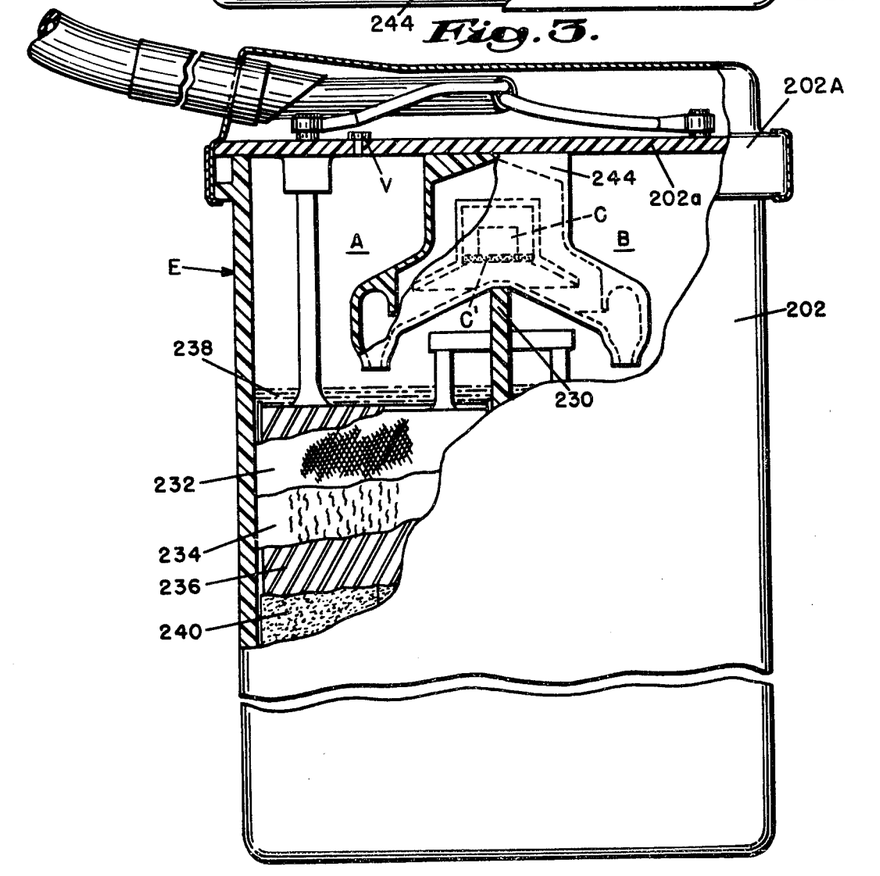
FIG. 3 is a side elevational view of the battery with portions broken away to illustrate a composite catalytic device for recombining gases in the battery.
Figure 4:
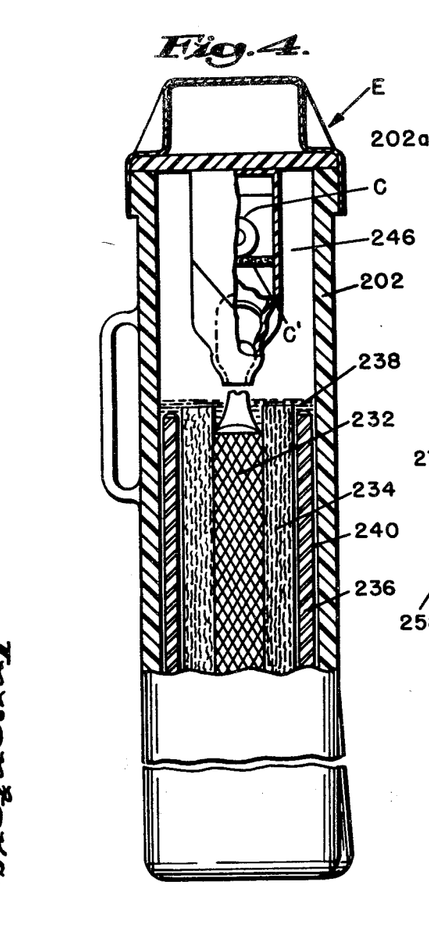
FIG. 4 is another vertical cross sectional view of the battery shown in FIGS. 2 and 3.

Contained in the cells referred to are positive plates 232, separator members 234, negative plates 236, electrolyte 238 and insulator means 240. The electrolyte is employed in an amount such as 210 mls to provide a liquid level which covers the tops of the plates. Immediately above the electrolyte are spaces A and B providing the specified volume of 300 mls in which gases evolved in the operation of the battery may be sealably contained. Conventional electrical conductor cables and terminals are provided as shown in FIG. 3.

While it is contemplated that for certain battery systems it may be desirable to provide a completely sealed gas space it is, in a preferred form of the invention, desirable to employ a pressure relief valve which may be regulated in accordance with a predictable range of pressure fluctuations to provide for confining gas within predeterminid releasable limits. The limits referred to are intended to fall below the maximum pressure retaining capabilities of the battery and may, for example, be of from 60 psig to 70 psig. A relief valve V, suitable for this purpose, may be mounted in the battery top in a position to communicate with the gas space as shown in FIG. 3.

At an upper section of the battery, the partition 230 has received there through a chamber assembly generally indicated by numeral 244 which comprises a housing for the catalytic device C. This housing 244 as best shown in FIG. 5, is formed with an upper chamber 246 in which the catalytic device C is supported in some suitable manner as by means of a screen C'.

The housing 244 is formed with a pair of conduit portions 258 and 260 which extend downwardly and which are open at their lower ends in communication with the spaces A and B. The conduit portions are adapted to receive gases evolved and conduct them upwardly through a common passageway 262 which allows gases from both cells to rise upwardly toward the catalyst C where recombination of stoichiometric quantities of the gases takes place with the formation of water vapor. This water vapor is returned to the battery electrolyte in some suitable manner. For example, in the structure shown in FIG. 5, the water vapor rises by convection caused by heat from the catalyst and condenses on a conical inner surface 264 at the top of the catalyst chamber.

The conical surface 264 is constructed so that condensed water will not drip on the catalyst. However, as the water vapor cools, it becomes heavier and drops into the condensing chambers 266a and 266b. The resulting water passes through the condensed water passages 268a and 268b and on out to the respective cells through openings 270a and 270b. The conduit portions are further formed with cavities 272a, 272b which are arranged to collect drops of electrolyte in the event that any should enter when the battery becomes placed in an inverted position. Baffle members 274a and 274b are arranged in the common passageway 262 in a position such that they may stop droplets of water running onto the catalyst when the battery is inverted.

Considering in further detail the composite catalytic device C, it should be understood that in recombining gases with this device, we may desire to support member C in various ways in a battery enclosure supported thereon and the assembly shown in the drawings indicates a screen member $C^1$ secured in the part 248 and having catalyst C supported thereon. This is intended to be illustrative of various other arrangements. Likewise the specific catalytic components hereafter described in detail may be varied in several respects and may be employed for various other catalytic functions.

Figure 7:
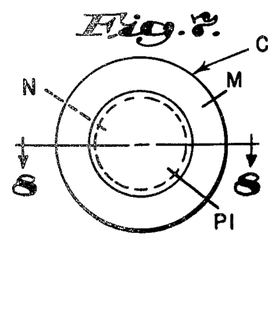
FIG. 7 is a detail enlarged view of the composite self-limiting catalytic device illustrated in FIGS. 2–5 and being removed from the battery and shown supported on a screen element of the battery.
Figures 8, 9:
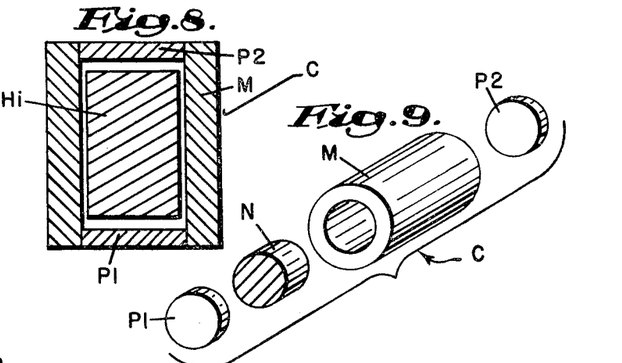
FIG. 8 is a cross section taken on the line 8—8 of FIG. 7.
FIG. 9 is a diagrammatic view illustrating components of the composite catalytic device in separated relationship.

In the arrangement illustrated in FIGS. 2–5, inclusive, and also in more detail in FIGS. 7–9, we have shown a single composite catalytic device C. As earlier noted, it should be understood that we may desire to employ a plurality of the catalytic devices arranged in various ways, as for example, on the screen $C^1$ or other supporting member to meet varying requirements.

Attention is especially directed to catalyst C as shown in FIGS. 7–9 inclusive wherein we provide an inner nucleus N of a high activity catalytic material which is capable of initiating recombination of gases such as hydrogen and oxygen in a very positive manner. Around this nucleus N, we locate an outer surrounding body of catalytic material M which is of relatively low activity but which can be rendered more active when heated by the nucleus and can, thereafter, sustain and carry out recombination of gases at its outer surface areas efficiently and more safely than can be done by the nucleus itself. FIG. 9 illustrates the nucleus N and outer catalytic material M in separated relationship.

The nucleus N, in one preferred form, may comprise a cylindrically shaped pellet consisting of a foraminous substrate of a substance such as porous alumina in which is impregnated or coated palladium. In this high level activity pellet the palladium concentration may, for example, be about 0.5% Pd by weight on a foraminous substrate having an internal surface area of about 90 sq m/g.

The outer surrounding body of catalytic material M may also comprise a porous substrate of alumina coated or impregnated with palladium to provide catalyst surfaces of low level activity, and in this case, the amount of palladium may be, for example, 0.01% by weight of palladium on a foraminous substrate having an internal surface of less than 1 sq m/g.

As shown in FIGS. 7–9, the outer catalytic material M may be of a tubular shape and formed with a central opening O within which the nucleus N may be received and the opening O is sealed at opposite ends of the material M by means of gas impermeable plugs as P1 and P2 of suitable nature.

It will be understood that other catalytic metals may be desired to be employed such as noble metals including platinum, rhodium, iridium, osinium, and the like, and it is intended that the shape of the nucleus N and outer catalyst body M may take other configurations as elliptical, box shaped and the like. Recombination capabilities may be readily related to those of the conventional palladium catalysts by testing them under varying rates of stoichiometric hydrogen and oxygen supply.

With the arrangement of components described, gases come into contact with catalytic surfaces of the material M which in an unheated state may be of insufficient activity to initiate recombination of the gases. However, the gases can readily pass through the porous material M and when they come into contact with the high-level active surfaces of the nucleus N, they start to recombine and form water.

Since the reaction thus initiated is an exothermic reaction, heat is generated cumulatively in the nucleus. When a sufficient build-up of heat develops, heat is released from the nucleus through the material M. This raises the temperature of the catalytic surfaces of low-level activity to a point where they may start and carry on recombination of a substantial portion of gases which thereafter come into contact with the outer catalytic surfaces.

Water of recombination in the form of water vapor is given off at the outer surrounding body surfaces and this vapor can then be condensed on the electrolyte and also on a suitable retaining surface such as the surfaces of the member 244 from where it will thereafter be carried off by gravity downwardly into the body of electrolyte 238.

It will be observed that as a result of sealing opposite ends of the member M with the gas impermeable plugs P1 and P2, the nucleus can only be contacted by gases which pass through the porous wall portions of member M and as soon as gases are recombined at the surfaces of material M, the nucleus is not required to operate and cannot heat excessively or will dissipate its heat through the larger surface area of the surrounding low-level catalysts at a safe temperature level.

A surprising and unexpected result of thus combining a high reactive catalytic metal on a foraminous substrate within an outer body of low catalytic metal on a similar substrate, is a novel heat release characteristic observed when pressures from increasing amounts of residual gases are experienced within the sealed battery enclosure. It is found that as residual gas pressure increases, the heat conductivity of the gases increases and therefore the temperature of the catalytic device does not continue to rise directly in relation to the partial pressure rise of combustible gases and thus the rate of reaction due to the catalyst does not increase directly in accordance with the partial pressure rise. On the contrary the temperature and recombination rate of the catalyst for any given heat transfer condition may level off or even drop even though the supply of combustible gases is increasing.

Figure 10:
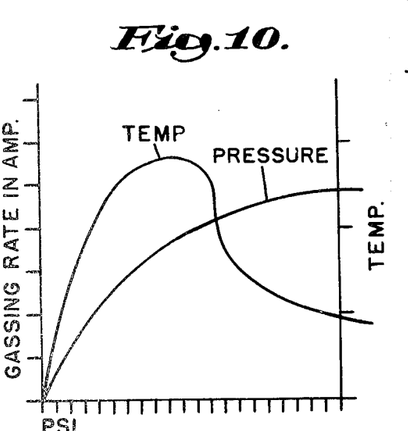
FIG. 10 is a diagrammatic view illustrating in graph form a temperature-limiting characteristic of the catalyst of FIGS. 7–9, inclusive.

As illustrative of specific examples of the self-limiting heat effect described we have carried out a number of experiments under simulated battery operating conditions, the results of which are illustrated in FIG. 10 in graph form. To study the behavior of catalysts under varying conditions as may be encountered in a variety of battery systems we have devised a battery simulating apparatus in which stoichiometric amounts of hydrogen and oxygen can be produced at predetermined rates by electrolyzing an electrolyte such as sulfuric acid as used in batteries.

The electrolyzer, which may be a suitable container with two platinum electrodes and leads to a power supply, is placed in a chamber which can be hermetically sealed so that catalysts and catalytic devices with their housings, etc., can be tested under any desired pressure conditions up to about four atmospheres. The sealed chamber is connected to a pressure gauge for reading or recording pressure changes and is provided with thermocouple leads through the chamber wall to allow for measuring the temperature of catalysts during simulation experiments. In the experiments which provided data for plotting the curves in FIG. 10 the composite catalyst included a nucleus having about .5% by weight palladium on an alumina substrate having an internal surface area of about 90 sq m/g and outer low level catalyst ring body having about 0.01% by weight palladium and an internal surface area of about 0.3 sq m/g. The general configuration was similar to the arrangement shown in FIGS. 7 and 8. The nucleus was in the form of a cylinder having a 3 mm diameter and a 3 mm height. The outer foraminous low level catalyst ring had an inner diameter of about 4 mm, an outer diameter of about 9 mm and an axial length of about 9 mm. The ends of the ring were capped with an epoxy cement to retain the nucleus. This composite pellet structure was placed in the simulating apparatus by suspending it in the gas space of the sealed chamber. A baffle member was arranged to protect the catalyst from electrolyte spray. The chamber was hermetically closed while containing air at atmospheric pressure and the catalyst was subject to increasing gassing rates by changing the electrolyzing current. The temperature and pressure reduced for each current used was noted. Inspection of FIG. 10 shows one curve for current vs. pressure and another for temperature vs. pressure. These curves illustrate that, while at first current, pressure and temperature rise together, a point is reached where with increasing pressure the temperature starts to drop and soon a point is reached where the pressure rises rapidly with current because the catalyst cannot consume increasing amounts of reactable gases. The temperature drop is due to the increased heat conductivity of the gases caused by the increased pressures.

To examine and demonstrate the safety and start up properties, such composites were also compared in the following experiments with the nucleus pellets but without a ring body on the one hand and capped low level rings, without the nucleus pellets, on the other hand. The catalyst to be tested is placed in a reaction chamber of about 110 cc volume. This chamber is then evacuated and preloaded with hydrogen from a hydrogen cylinder up to the partial hydrogen pressure desired for the experiment. Oxygen is preloaded into a large vessel at a pressure equivalent to that desired for the final stoichiometric mix in the reaction vessel. This larger oxygen chamber has a valved connection with the reaction chamber.

To effect reaction, the valve between the two chambers is opened for a short period. In this manner a reasonably close approximation to stoichiometric hydrogen-oxygen mixtures at a predetermined pressure can be rapidly generated. For example, if one wishes to obtain an approximately stoichiometric mix of hydrogen and oxygen at 2 atmospheres the reaction chamber is preloaded with 1⅓ atmospheres of hydrogen. The oxygen chamber is preloaded with 2 atmospheres of oxygen. On sudden opening of the valve, the resultant pressure will be just slightly less than 2 atmospheres since the oxygen chamber is many times larger than the reaction chamber. Quick closing of the valve prevents any significant hydrogen back diffusion and thus keeps stoichiometry within useful accuracy for the test. After closing the valve, the time in which the pressure goes to half the original value is determined (half life) as an indication of reaction rate. Explosion or ignition is noted from visual and audio-observance. The following table shows some typical results:

| Catalyst | Total Pressure (Atmos. Absolute) | Half Life (Mins) | Remarks |
|---|---|---|---|
| Composite | 2.0 | 12 | no visible heat radiation |
|  | 2.5 | 12 | " |
|  | 3.0 | 14 | " |
|  | 4.0 | 16 | " |
| Low level ring Capped room temp Without nucleus | up to 4.0 | no reaction | in 30 minutes |
| Ring preheated to 160°C | 3.0 | 33 |  |
| Nucleus pellet Without Ring |  |  |  |
| (a) | 1.0 | 0.7 | pellet glows, no ignition |
| (b) | 1.0 | explosion | delayed activation sudden explosion after 1.5 minutes |

These experiments clearly show that the composites start up readily and consume at a limited rate without overheating or visible heat radiation even at 4 atmospheres. The low activity catalyst does not start up when cold, but reacts slowly when preheated. The nucleus type pellet in one case became red-hot and in another case exploded at only one atmosphere. In the case where no explosion occurred with a standard pellet, one will note that the half-life was significantly smaller than for the composite, another indication of the rapid, uncontrolled reaction rate.

The experiments above-noted also demonstrate clearly that catalyst temperatures, controlled by means of a composite catalytic device having heat release characteristics based on limited catalyst activity levels, may be regulated to maintain catalyst temperatures within predetermined limits.

In its broadest aspect, our method of controlling heat release characteristics of a catalytic device may also be extended to include use of a bed of pellets or other catalytic devices whose catalytic activity levels and cumulative heating action are adjusted to provide predetermined catalyst temperatures.

For example, another safety test was made in the simulating equipment described, this time using a bed of catalysts of the same dimensions as the nucleus pellets above, but impregnated at a low level namely 0.01% by weight palladium on a foraminous alumina substrate having about 0.3 sq. m/g internal surface. When using five pellets, a minimal amount to give a thermally favorable environment, start up could be achieved and at thirty to forty psi absolute stoichiometric pressure half lives of about twenty minutes were obtained. Five nucleus pellets (with 0.5% by weight palladium) as described above exploded within thirty seconds at a pressure of about 1 atmosphere.

In another experiment in the simulating equipment above referred to a catalyst pellet, again of the dimensions of the above nucleus, but this time with a low level impregnation of 0.1% by weight palladium on a foraminous alumina substrate having an internal surface area of about 0.3 sq m/g was used. A single pellet suspended in the gas space did not start. Then 17 grams of pellets were put into a holding device. At a gassing rate corresponding to one ampere the temperature rose only to 20° above ambient. The catalysts started up with 10 minutes from the beginning of gassing showing the effect of providing a thermally favorable environment.

In reference to use of low-level activity pellets, we have observed that such catalysts are not necessarily inactive but rather do not generate enough heat to start recombination effectively. While the exact mechanisms are not fully understood, we believe heating proceeds in the manner suggested below but the explanation noted is not to be taken as limiting the invention thereto.

Thus we have observed that when the catalysts such as palladium impregnated porous alumina pellets are held in an environment free from reactable gases, the pellets may not immediately start to assume full catalyst activity when subsequently exposed to such gases. For example, we find that commercially available catalysts of a highly reactive material such as catalyst pellets containing 0.5% per weight palladium and approximately 90 square meters per gram surface area, held free from reactive gases, may when thereafter exposed to gases take as long as 30 to 45 minutes before becoming fully reactive. These pellets are not entirely unreactive before fully reactivity sets in. If, however, a bed of such pellets is immediately subjected to reactable gases, it is observed that reactivity starts rapidly within minutes.

We believe this may be explained by the fact that temporary inactivity is due to absorbed water films, perhaps of a few molecular layers in thickness and that, therefore, reactivity is limited by diffusion through these films. Only when sufficient reactable gas is present to permeate the films will the exothermic heat generated be enough to strip off the films and to allow full reactivity to become operative.

For example, if low-level activity safe catalysts are used such as pellets equivalent to about 0.1% palladium or less on less than 1 sq m/g alumina substrate they may be incapable of generating enough heat to strip off said water layers. However, if a bed of such pellets includes a center or nucleus which is thermally isolated from surrounding pellets, the low-level heat generated by all of them will accelerate cumulative heating in the nucleus zone and thus make the center fully reactive. The heat cumulatively built up in the center will then be progressively transferred to the periphery of the mass and thus make the outer low-level pellets suitably reactive.

Figure 11:
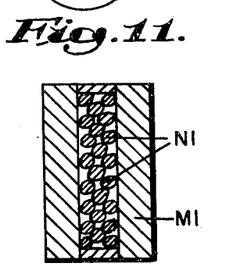
FIGS. 11–13 illustrate modified forms of the composite catalytic device of FIGS. 7–9, inclusive.

Considering in greater detail specific examples of catalytic pellets in the form of beds of pellets, attention is directed to FIGS. 11 to 20. Referring in detail to FIG. 11, we have shown a modification of composite catalyst device in which a plurality of high-level catalyst pellets N1 are received in an enclosing catalytic material M1 of low-level activity and this enclosure is sealed by plugs P1' and P2'. With such an arrangement, an increased capacity for recombining may be obtained with more rapid initial recombination being induced.

Figure 12:
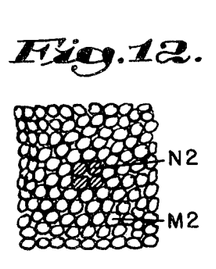

In FIG. 12 we have shown another composite arrangement in which a plurality of high-level pellets N2 are connected together and are enclosed by outer low-level pellets M2. In this case, interstices occurring between the low-level pellets M2 provide a porosity characteristic which allows the catalystic device to function in substantially the same manner as the device of FIGS. 7–9.

Figure 13:
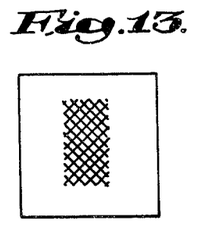

In FIG. 13, a nucleus N3 is comprised by an inner portion of an integral body of foraminous material, such as alumina, which has a relatively high level reactivity and an outer body of lesser activity. This structure is intended to illustrate a gradient impregnation with palladium or other catalyst material.

In FIGS. 14–19, inclusive, we have illustrated still another modification of a bed arrangement of pellets which may also be employed to carry out the two-stage heating function of the invention.

Figure 14:
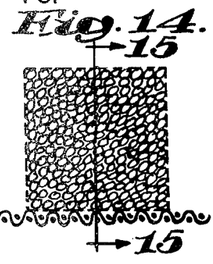
FIGS. 14–20, inclusive, illustrate diagrammatically still other forms of catalytic devices of the invention.
Figure 15:
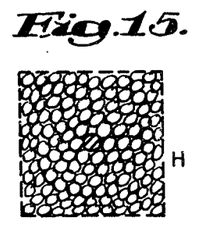

In FIGS. 14 and 15 a nucleus N4 is enclosed in a bed of low activity pellets M4 which is in turn enclosed by a perforated housing H. This provides a contained pellet body useful in some battery applications.

Figure 16:
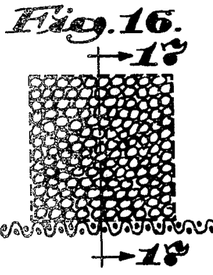
Figure 17:
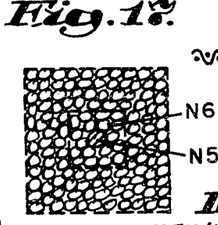

In FIGS. 16 and 17 a nucleus N5 is surrounded by a second nucleus N6 of lesser activity which is in turn enclosed by a perforated separator device J and located around the member J is an outer body of low-level activity pellets M in a housing H2. This arrangement provides a progressive nucleus heating effect useful in some instances.

Figure 18:
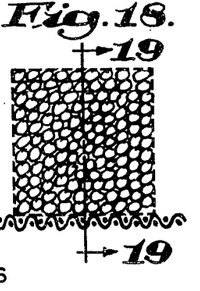
Figure 19:
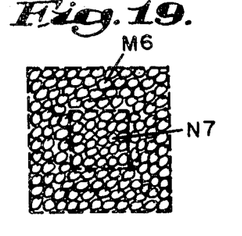

In FIGS. 18 and 19 a variation of FIGS. 16 and 17 is shown in which a plurality of high-level pellets N7 are contained in a separator J1 in turn surrounded by low-level pellets M6.

Figure 20:
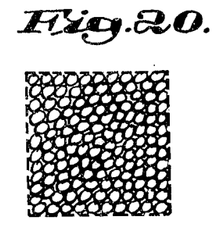

In FIG. 20 we have illustrated a composite catalytic device comprised of a plurality of pellets in bed form all of which are of low-level activity and regulated in accordance with the invention in heat release characteristics so that a limited heat is realized and the temperature of the catalyst is maintained below 250°C.

Generally we have found that using alumina as the substrate material, as is a common practice for palladium catalysts, it will be preferable to have as a catalytic nucleus material alumina substrates with an internal surface area greater than 50 square meters per gram and having a surface loading of palladium of not less than 0.2% by weight based on the substrate weight in said nucleus. It was also found that for the outer exposed catalytic material it is preferable to have a substrate having not more than 1 square meter per gram internal surface area with a palladium loading of less than 0.05% palladium based on the substrate weight.

It will be apparent that the method of recombination with a composite or multi-stage catalytic device is capable of application in a wide range of catalytically induced reactions with a wide range of batteries occurring in varying size and utilizing different electrolytes. In these various connections, the use of a plurality of pellets to form a nucleus may be employed in various other ways.

It will also be seen that there exists a unique cooperative relationship between associated catalytic material of differing activity and this arrangement of associated catalytic materials may be varied or modified in several ways. For example, it is pointed out that while a nucleus serves to increase the activity of an outer surrounding body, the surrounding body may be varied to retard and regulate flow of gases to the nucleus in order to control excessive temperature rise by the nucleus as well as flooding by excessive moisture content.

It is still further intended that the principle of a composite catalytic device having predetermined heat release characteristics may be introduced into catalytic devices to be used in fields of application outside of battery use.

We claim:

1. A self-limiting composite catalyst device for recombining hydrogen and oxygen with exothermic heating in a sealed battery chamber in which hydrogen and oxygen are evolved and exert increased pressure, said catalyst device including a nucleus of enclosed catalyst consisting in a catalyst-supporting body of alumina and a catalyst metal of palladium having a relatively high-level gas-recombining capability contained on the catalyst-supporting body, and a foraminous outer cylindrical enclosure member which defines an enclosed space in which gases may be received and held in contact with the nucleus, said enclosure member having exposed surfaces of relatively low-level gas-recombining capability through which hydrogen and oxygen gases may pass into contact with the nucleus and said exposed surfaces consisting in a catalyst supporting material having contained therein a quantity of catalyst metal capable of undergoing heating in a range of exothermic heating which is limited in response to increase in pressure in the sealed battery chamber and which lies within limits of from 400° C to 600° C, and said quantity of catalytic metal in the exposed surfaces occurring in amounts of from about 0.01% up to 0.1% by weight, and said outer catalyst supporting material having an internal surface area occurring between 0.3 square meters per gram up to a value of less than 1 square meter per gram, and said catalyst metal of relatively high-level gas-recombining capability in the nucleus occurring in a quantity of not less than 2% of catalyst metal, and said catalyst supporting body in the nucleus having a surface area of more than 50 square meters per gram.

* * * * *